Dec. 13, 1966  L. E. HAAS  3,290,871
EMERGENCY BRAKE FOR INTERNAL COMBUSTION ENGINE
Filed July 20, 1964  5 Sheets-Sheet 1
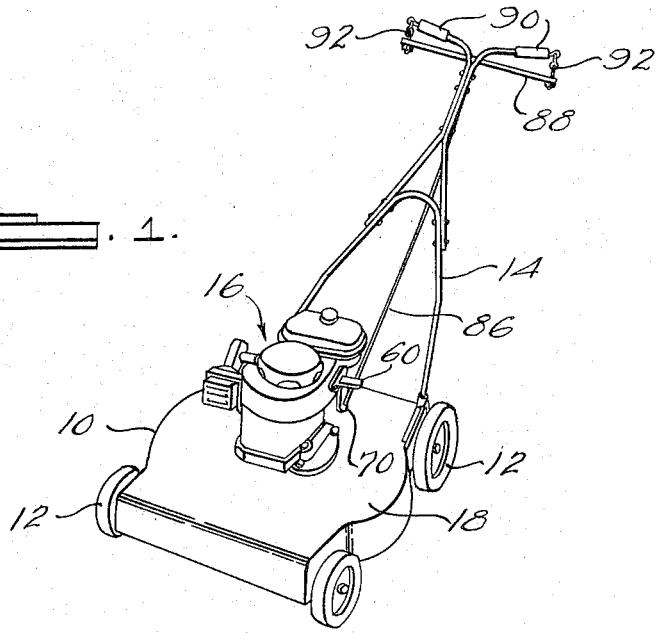
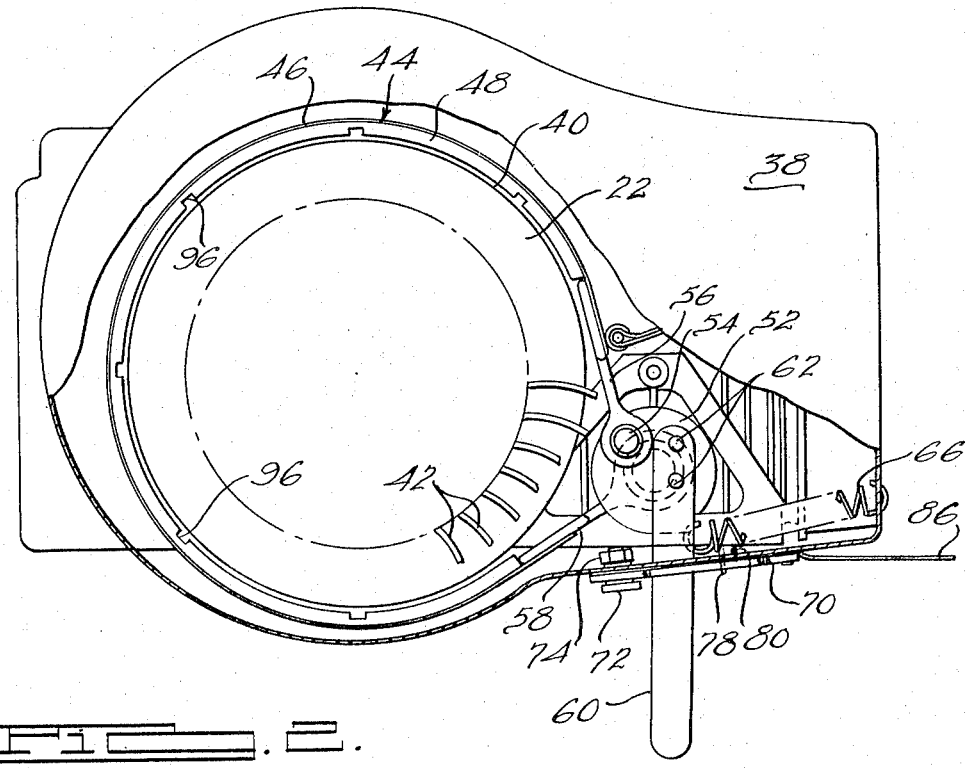
INVENTOR.
Lowell E. Haas.
BY
Balluff and McKinley
ATTORNEYS.

Dec. 13, 1966  L. E. HAAS  3,290,871
EMERGENCY BRAKE FOR INTERNAL COMBUSTION ENGINE
Filed July 20, 1964  5 Sheets-Sheet 2
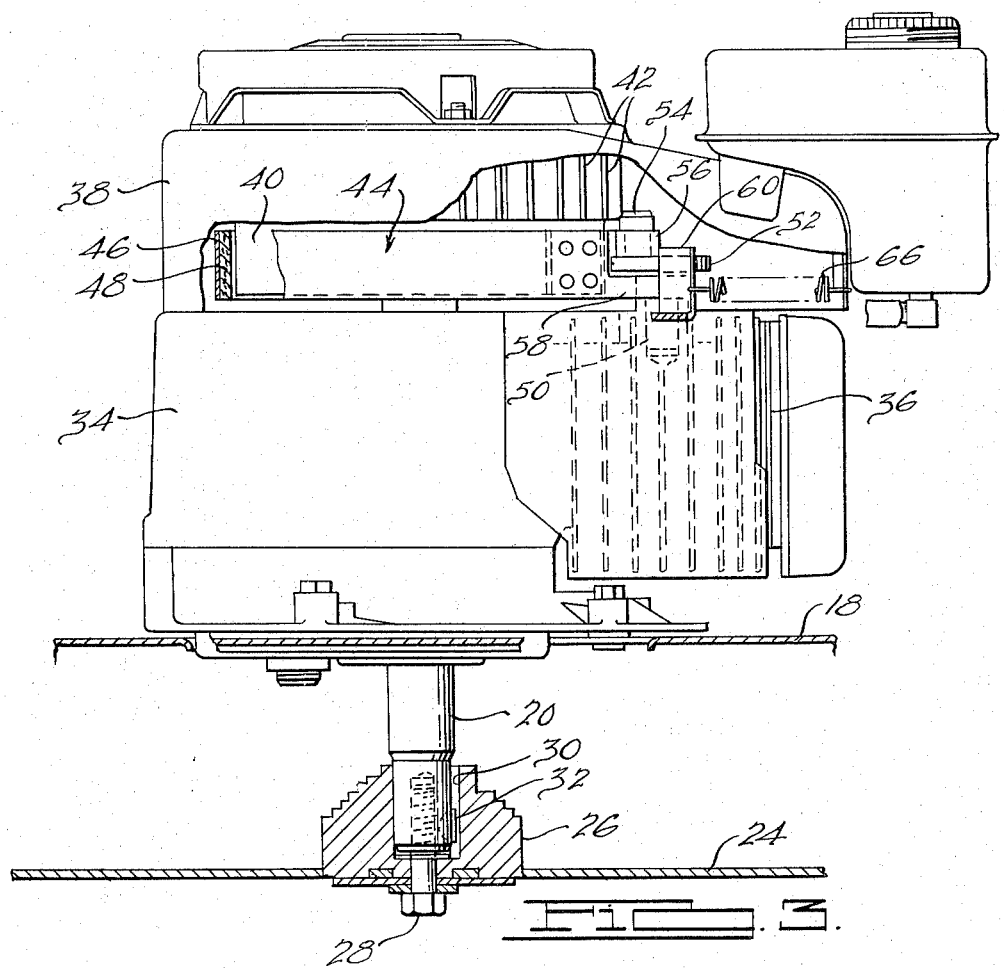
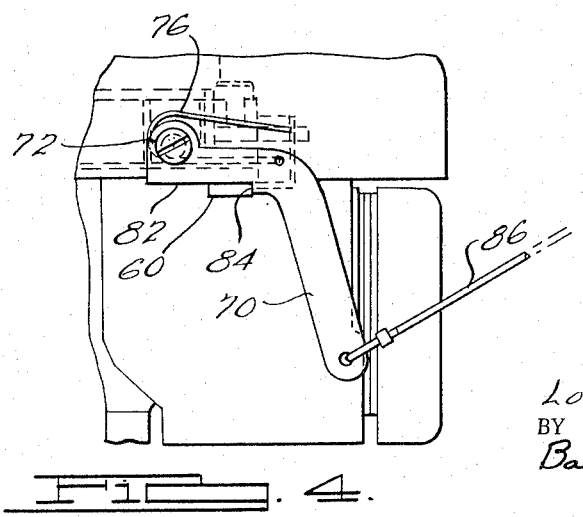
INVENTOR.
Lowell E. Haas
BY
Balluff and McKinley
ATTORNEYS.

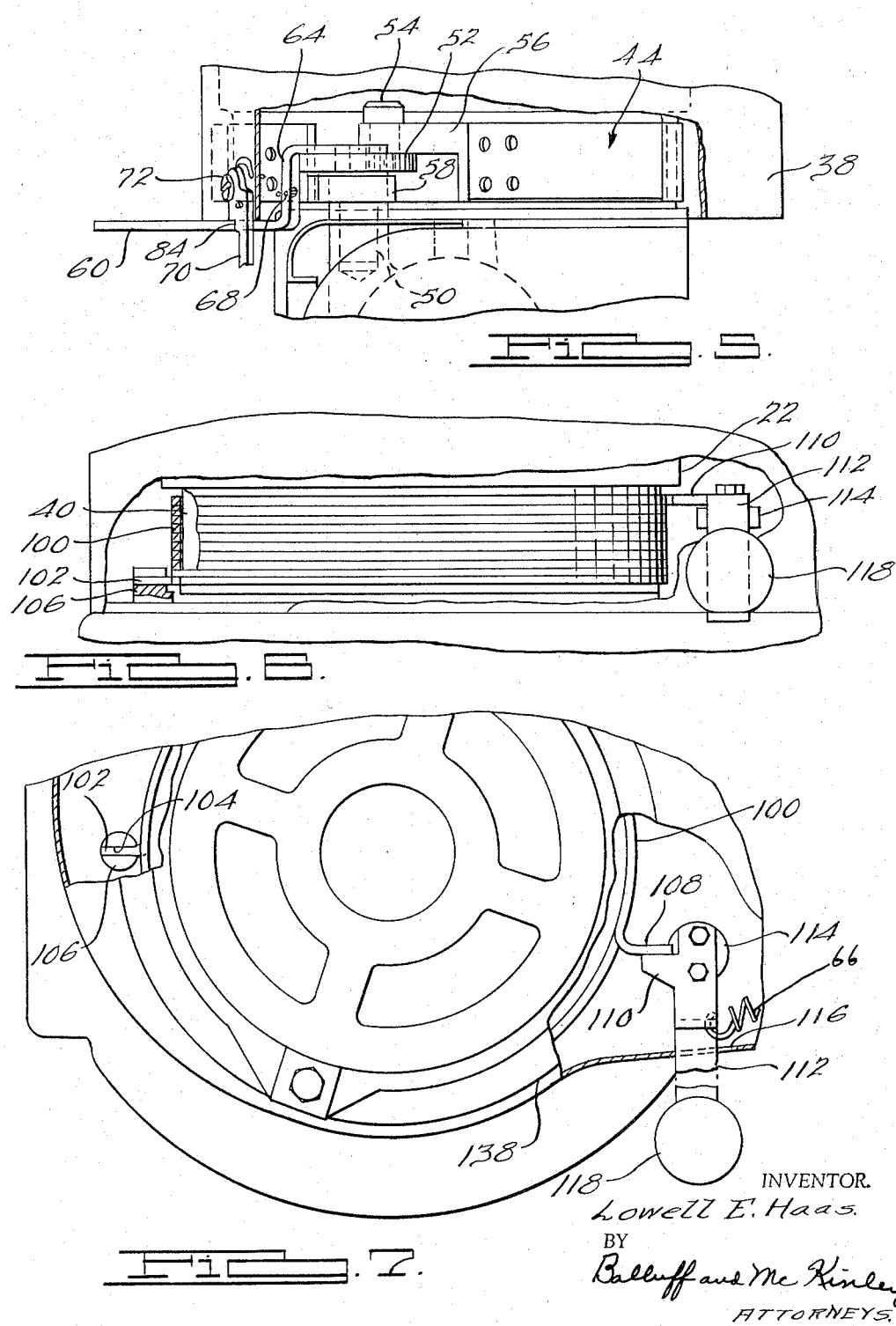

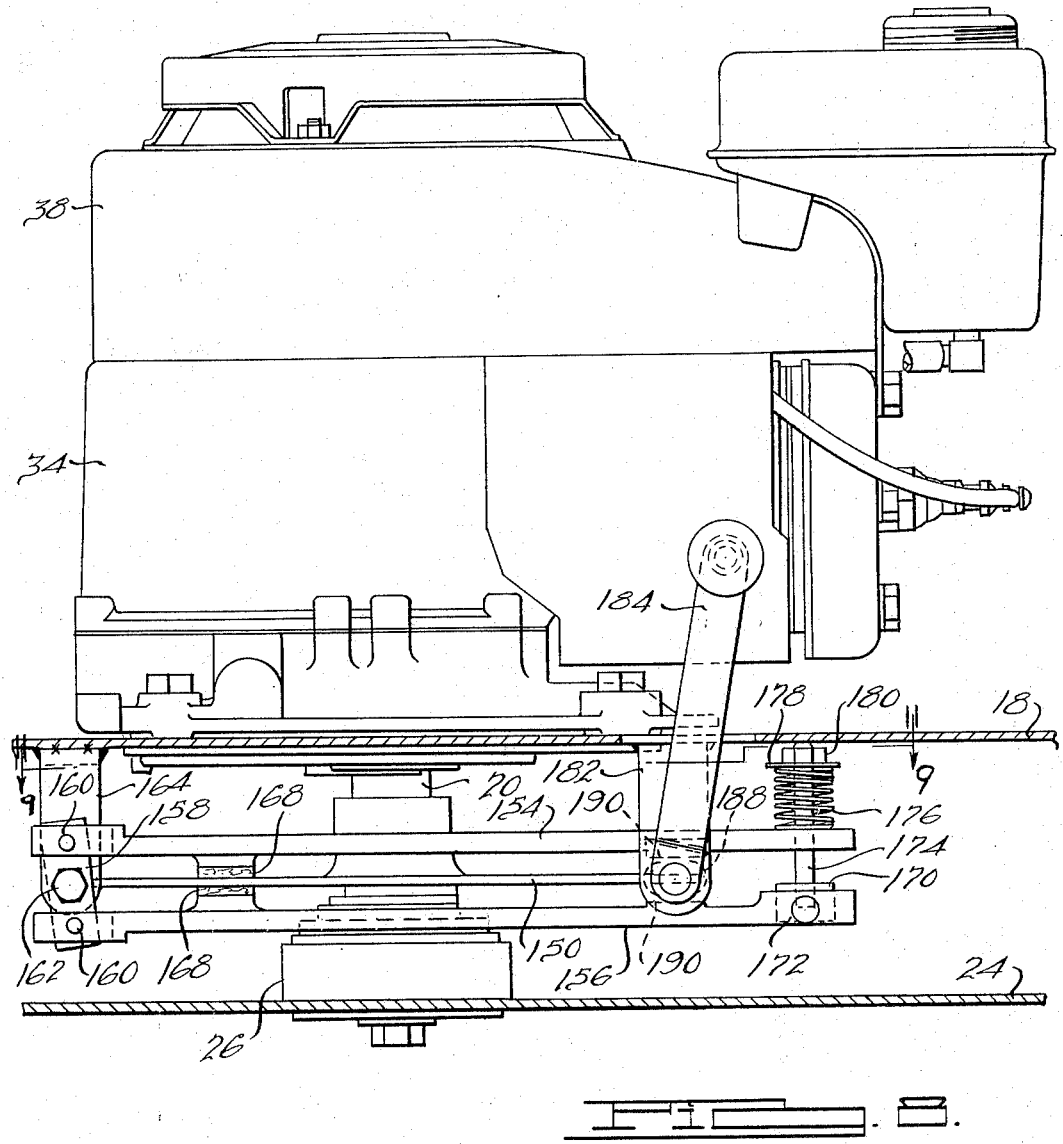

Dec. 13, 1966 L. E. HAAS 3,290,871
EMERGENCY BRAKE FOR INTERNAL COMBUSTION ENGINE
Filed July 20, 1964 5 Sheets-Sheet 5
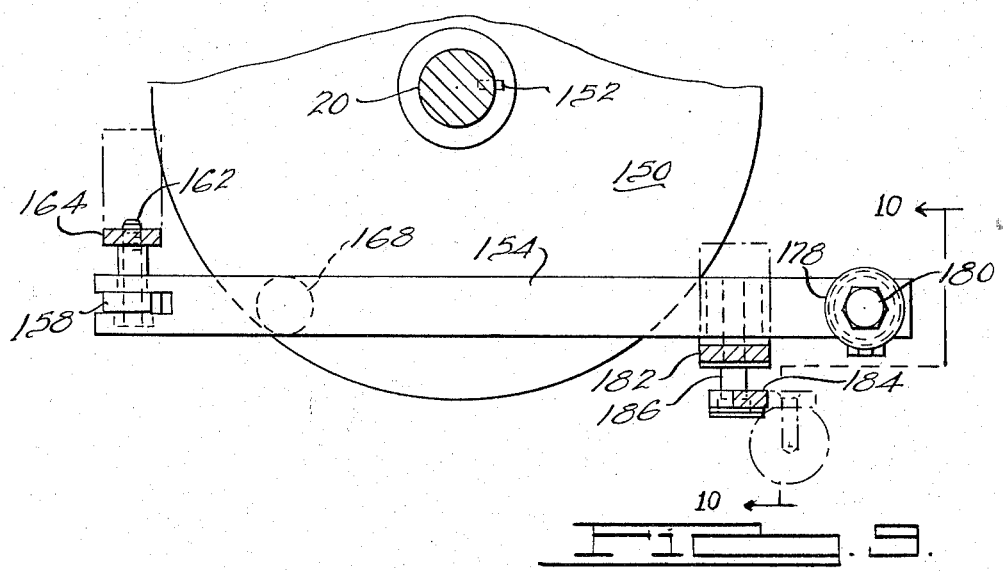
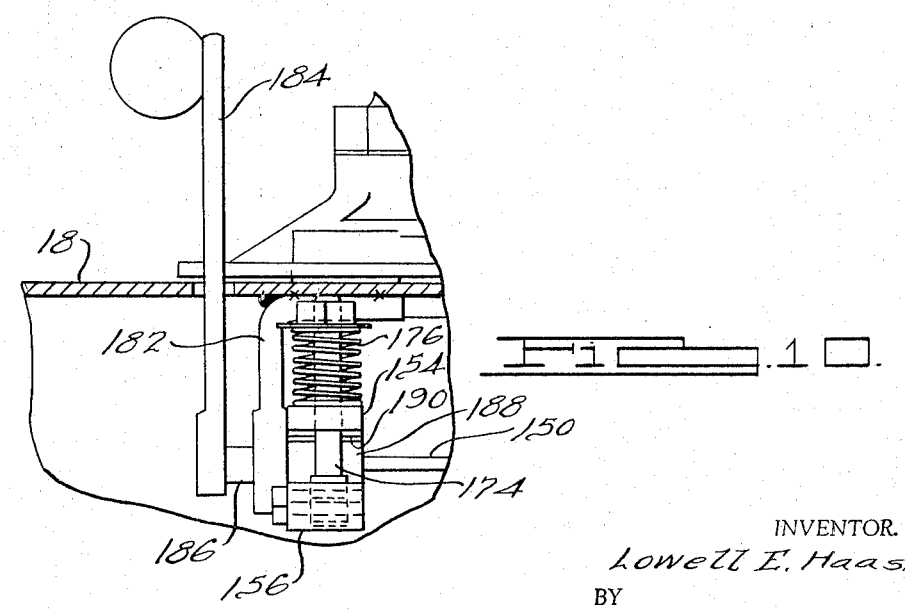
INVENTOR.
Lowell E. Haas,
BY
Balluff and McKinley
ATTORNEYS.

United States Patent Office 3,290,871
Patented Dec. 13, 1966

3,290,871
EMERGENCY BRAKE FOR INTERNAL
COMBUSTION ENGINE
Lowell E. Haas, Maquoketa, Iowa, assignor to Clinton Engines Corporation, Maquoketa, Iowa, a corporation of Michigan
Filed July 20, 1964, Ser. No. 383,813
11 Claims. (Cl. 56—25.4)

This invention relates to an emergency brake mechanism for an internal combustion engine of the type commonly employed as the source of power for a rotary lawn mower, and has particular reference to a spring-loaded brake which may be applied to such an engine to substantially instantaneously stop the engine and the rotary cutting blade whenever a control lever is actuated by the operator of the lawn mower.

Emergency brake systems for preventing accidental injuries resulting from contact with the cutting blade of a rotary lawn mower have been proposed heretofore. However, such prior proposals have not satisfactorily solved the problem of providing a means for stopping rotation of the cutting blade substantially instantaneously whenever desired by the operator. According to the present invention, the cutting blade is keyed or otherwise rigidly secured to the crankshaft of the engine and a part which is driven with the crankshaft, such as the flywheel of the engine, provides an annular braking surface or brake drum which may be engaged by a brake band or other element having brake lining material thereon. The brake band is urged by a spring into engagement with the brake drum, but is held out of braking engagement with the brake drum during normal use and operation of the engine. A control device, which is easily accessible to the operator, is provided for releasing the brake band so that the spring is effective to immediately engage the brake band with the brake drum thereby substantially instantaneously stopping the engine and the cutting blade driven thereby.

A principal object of the invention is to provide a brake mechanism for an internal combustion engine which will stop the engine substantially instantaneously upon actuation of a triggering mechanism.

Another object of the invention is to provide an engine of the type used on a rotary lawn mower with a brake structure for stopping the engine and the rotary cutting blade driven thereby substantially instantaneously upon application of the brake by the operator.

A further object of the invention is to provide a brake for an internal combustion engine of the type described which must be cocked before the engine can be started so that the brake is always in condition for immediate actaution by the operator.

Another object of the invention is to provide an emergency brake for stopping the cutting blade of a rotary power lawn mower and the engine which drives the blade without the use of any clutch mechanism between the engine and the cutting blade.

Another object of the invention is to provide a brake structure of the type described which is simple in construction, economical to manufacture and install and efficient in operation.

Other and further objects of the invention will be apparent from the following description and claims and may be understood by reference to the accompanying drawings of which there are five sheets, which by way of illustration show preferred embodiments of the invention and what I now consider to be the best mode of applying the principles thereof. Other embodiments of the invention may be used without departing from the scope of the present invention as set forth in the appended claims.

In the drawing:
FIG. 1 is a perspective view of a rotary lawn mower in which the engine which drives the cutting blade is provided with a brake mechanism according to the present invention;
FIG. 2 is a top plan view with parts broken away of a brake which may be applied to the flywheel of the engine;
FIG. 3 is a side elevational view with parts in section of the engine and brake structure shown in FIG. 2;
FIG. 4 is a fragmentary elevational view of a part of the brake mechanism;
FIG. 5 is an end elevational view of the brake;
FIG. 6 is a fragmentary elevational view illustrating a different type of brake band which may be applied to the flywheel of the engine;
FIG. 7 is a fragmentary top plan view of the brake structure shown in FIG. 6;
FIG. 8 is a side elevational view of an engine provided with a different type of brake structure;
FIG. 9 is a sectional view taken on line 9—9 of FIG. 8; and
FIG. 10 is a sectional view taken on line 10—10 of FIG. 9.

Referring to FIGS. 1 to 5, a rotary type power lawn mower of conventional construction including a housing 10 provided with wheels 12 and a handle structure 14 is powered by an internal combustion engine 16 which is mounted on the deck 18 of the housing 10. The engine 16 is of the type in which the crank shaft 20 is vertically disposed and extends downwardly through the deck 18 with a flywheel 22 secured on the upper end of the crank shaft 20. The cutting blade 24 of the mower is secured to a hub 26 which is secured on the lower end of the crank shaft 20 by a bolt 28. The hub 26 is provided with a keyway 30 and a key 32 engaging in the keyway 30 and a slot in the lower end of the crankshaft 20 provides a keyed connection between the cutting blade 24 and the crankshaft 20 so that the blade is rigidly secured to the crankshaft for rotation therewith.

The engine 16 is of the single cylinder type and includes a crankcase 34 and a horizontally disposed cylinder 36. A shroud 38 is secured on the engine casting and encloses the flywheel 22. The flywheel is keyed to the crankshaft 20 and may be of conventional construction except that it is provided with an annular brake surface 40 thereon below the blades 42. The surface 40 of the flywheel provides a brake drum which is surrounded by a flexible brake band 44 which may consist of a spring steel backing 46 having brake lining material 48 suitably bonded or riveted thereto.

A mounting post 50 is rotatably mounted within a socket in the cylinder casting 36 and is provided with an enlarged shoulder 52 having a pin 54 projecting upwardly therefrom. The opposite ends of the brake band 44 are provided with eyelets 56 and 58. The eyelet 56 is fitted over the pin 54 and the eyelet 58 is rotatably mounted on the post 50 below the shoulder 52 thereon. A cocking lever 60 has one end secured to the upper surface of the shoulder 52 on the post 50 by bolts 62. The lever 60 is provided with a vertically extending portion 64 and then projects horizontally outwardly through a slot in the shroud 38. A spring 66 has one end 68 secured to the vertical portion 64 of the lever 60 and has its other end anchored to the shroud 38. The spring 66 is under tension so that it urges the lever 60 in a counterclockwise direction as viewed in FIG. 2. It will be seen that rotation of the lever 60 in a counterclockwise direction will contract the brake band 44 into engagement with the surface 40 of the flywheel 22.

A lever 70 is pivotally mounted on the shroud 38 by a screw 72 which extends through an aperture in the lever 70 and the shroud 38 and is provided with a nut 74 on its outer end. A torsion spring 76 is wrapped around the screw 72 and has one end 78 secured within an aperture in the lever 70 and its other end 80 secured within an aperture in the shroud 38. The spring 76 tends to rotate the lever 70 in a clockwise direction as viewed in FIG. 4.

The outer end of the lever 60 extends beneath a horizontal portion 82 of the catch lever 70. A shoulder 84 on the lever 70 engages the cocking lever 60 as shown in FIGS. 4 and 5 to prevent rotation of the lever 60 under the influence of spring 66. When the cocking lever 60 is swung in a clockwise direction, the brake band 44 will be released from engagement with the flywheel 22 and the outer end of the lever 60 will be moved behind the shoulder 84 on the lever 70 to hold the cocking lever 60 in its cocked position. The engine can now be started and operated in a normal manner.

A control cord or wire 86 is connected at one end to the lower end of the catch lever 70 and extends upwardly along the handle 14 on mower to a trigger rod or bar 88, which is disposed a short distance below the handles 90 by which the mower is guided in normal use. The outer ends of the trigger 88 are connected to the outer ends of the handles 90 by flexible chains or other suitable flexible linkages 92.

When it is necessary to stop the cutting blade as quickly as possible because of a threatened injury to the operator or other person, or because of potential damage to the blade or engine due to foreign objects in the path of the mower, it is merely necessary for the operator to close his fingers around the trigger bar 88, to pivot the catch 70 on the pin 72 to disengage the shoulder 84 on the lever 70 from the cocking lever 60, whereupon the spring 66 is immediately effective to rotate the cocking lever 60 in a counterclockwise direction thereby substantially instantaneously applying the brake and stopping the engine and the cutting blade secured thereto. The brake is thus self-energizing and spring loaded in a direction to apply the brake and the operator need exert only a very slight force on the trigger bar 88 to energize the brake. The spring 66 should be sufficiently strong to ensure that the brake band is substantially instantaneously applied to the flywheel with sufficient force to immediately stop the engine.

When the engine has been stopped by application of the brake, it cannot be again started until the brake is returned to its cocked position by rotating the lever 60 in a clockwise direction until the shoulder falls down behind the lever 60 as previously described. This construction not only ensures that the brake will always be in condition for immediate application to stop the engine while the mower is in use, but also provides an additional safety factor against accidental starting of the engine by children.

The brake lining 48 may be provided with a series of vertically extending grooves 96 so that any dirt or grass which might tend to accumulate between the brake and flywheel can be eliminated.

In the form of the invention shown in FIGS. 6 and 7, the brake band 44 has been replaced by a different type of brake which consists of a coil of spring wire surrounding the braking surface 40 of the flywheel. The wire brake 100 has one end 102 bent outwardly and disposed within a slot 104 in a boss 106 on the engine casting. The other end 108 of the wire brake is bent outwardly and is adapted to be engaged by a lug 110 on a cocking lever 112 which is secured on the upper end of a rotatable post 114 mounted on the engine casting. The lever 112 extends through a slot 116 in the shroud 38 and may be provided with a knob 118 by means of which the lever 112 may be manipulated manually.

The wire 100 is tensioned so that it normally engages the braking surface on the flywheel 22. However, the lever 112 may be swung in a clockwise direction as viewed in FIG. 7 to engage the end 108 of the wire 100 to release the latter from engagement with the flywheel. A spring 66 urges the lever 112 in a counterclockwise direction. As soon as the lever 112 is rotated in a counterclockwise direction by spring 66, the spring 100 will contract into engagement with the braking surface of the flywheel. The brake is self-energizing and will immediately engage sufficient braking surface on the flywheel to substantially instantaneously stop the engine and the cutting blade carried thereby. A catch lever 70 and trigger device 88 like that shown in the previously described embodiment may also be employed although they are not illustrated in FIGS. 6 and 7.

In the form of the invention shown in FIGS. 8, 9 and 10, the brake is applied to a part other than the flywheel such as a metal disc 150 which is rapidly secured to the crankshaft 20 by a key 152. The disc 150 may be positioned beneath the deck 18 of the mower and between the deck and the rotary cutting blade 24. The brake mechanism comprises a pair of generally horizontally disposed lever arms 154 and 156 each of which is pivotally connected at one end to an arm 158 by pins 160. The arm 158 is pivotally mounted by a bolt 162 on the lower end of a mounting bracket 164 which is welded or otherwise secured to the underside of the mower deck 18. The lever arms 154 are disposed at one side of the crankshaft 20 and are disposed above and below the brake disc 150. The levers 154 and 156 are provided with pads 168 of brake lining material which are engageable with the opposite surfaces of the disc 150 adjacent its periphery.

The lever arm 156 is provided with a socket member 170 at its outer end retained thereon by a screw 172. A bolt 174 extends freely through an aperture in the arm 154 and is threaded into the socket member 170. A compression spring 176 is confined between the upper surface of the arm 154 and a washer 178 engaging the head 180 of the bolt 174. The spring 176 therefore urges the outer ends of the lever arms 154 and 156 toward each other to engage the brake linings 168 with the disc 150.

A mounting bracket 182 is secured to the underside of the mower deck 18 and extends downwardly therefrom alongside the arms 154 and 156. A cocking lever 184 is pivotally mounted on the bracket 182 by a pin 186 which is rigidly secured to the lever 184. The pin 186 is provided with a cam 188 which is disposed between pads 190 formed on the opposing surfaces of the arms 154 and 156. When the cocking lever 184 is rotated in a counterclockwise direction as viewed in FIG. 8, the high points of the cam 188 will engage the arms 154 and 156 to spread the same sufficiently to disengage the brake linings 168 from the disc 150. As soon as the lever 184 is rotated in a clockwise direction to the position shown in FIG. 8, the spring 176 will be effective to immediately swing the arms 154 and 156 toward each other to engage the brake linings 168 with the brake disc 150 thereby stopping the engine and the cutting blade carried thereby. The floating pivotal mounting of the arms 154 and 156 on the arm 158 ensures that the brake linings will always uniformly engage the brake disc with sufficient force to substantially instantaneously stop the engine. The lever 184 is urged by a spring 66 in a clockwise direction to its released position and retained in its cocked position by a suitable catch mechanism with the catch being releasable through a control cord extending to a trigger on the mower handle as described in connection withs FIGS. 1 to 5. Any other suitable catch or detent mechanism may be employed for holding the cocking lever 184 in its cocked position.

While the brake mechanism of this invention has been described in connection with an engine for use on a rotary lawn mower, it will be apparent that the brake structure will be useful on other types of engines and for engines adapted to other intended uses. It will also be apparent that the brake could be applied to other rotating parts of the engine and that the brake disc shown in FIGS. 8, 9 and 10 could be located elsewhere on the crankshaft or even within the crankcase of the engine.

While I have illustrated and described preferred embodiments of my invention, it is understood that this is capable of modification, and I therefore do not wish to be limited to the precise details set forth but desire to avail myself of such changes and alterations as fall within the purview of the following claims.

I claim:

1. In an internal combustion engine having a crankshaft and a driven element directly secured to said crankshaft so as to rotate with said crankshaft at all times, an emergency brake for stopping rotation of both the crankshaft and the driven element, comprising a part rotatable with the crankshaft of the engine and having a braking surface thereon, a brake element movable into and out of engagement with said braking surface, spring means urging said brake element into engagement with said braking surface, a cocking lever engageable with said brake element and movable to a cocked position for retaining said brake element out of engagement with said braking surface, catch means releasably holding said cocking lever in said cocked position, and a control member connected to said catch means for releasing said catch means from said cocking lever whereby said spring means is effective to engage said brake element with said braking surface to substantially instantaneously stop said engine and said driven element.

2. In an internal combustion engine for a rotary lawn mower, said engine having a vertically disposed crankshaft and a cutting blade rigidly secured on the lower end of the crankshaft so as to be rotated at crankshaft speeds at all times, an emergency brake for stopping rotation of both the crankshaft and the cutting blade carried thereby comprising a part rotatable with the crankshaft of the engine and having a braking surface thereon, a brake element movable into and out of engagement with said braking surface, spring means urging said brake element into engagement with said braking surface, a cocking lever movable to a cocked position for retaining said brake element out of engagement with said braking surface, catch means releasably holding said cocking lever in said cocked position, and a control member connected to said catch means and to a trigger adjacent the handle of the mower for releasing said catch means from said cocking lever whereby said spring means is effective to engage said brake element with said braking surface to substantially instantaneously stop both said engine and the cutting blade carried thereby.

3. In a rotary lawn mower powered by an internal combustion engine having a vertically disposed crankshaft with a cutting blade rigidly secured on the lower end of the crankshaft and a flywheel rigidly secured on the upper end of the crankshaft; an emergency brake for stopping rotation of the crankshaft and the cutting blade carried thereby, comprising an annular braking surface on the flywheel concentric with the crankshaft axis, a friction brake surrounding said surface, means anchoring one end of said brake on the engine, a lever pivoted on the engine and engageable with the opposite end of said brake, spring means urging said brake into frictional engagement with said surface for stopping the engine, a pivotal catch engageable with said lever for retaining the same in a cocked position in which said brake is out of engagement with said surface, and a control member leading from said catch to adjacent the handle of the mower for disengaging the catch from said lever whereby said spring is effective to engage said brake with said surface and substantially instantaneously stop said engine.

4. In a rotary lawn mower powered by an internal combustion engine having a vertically disposed crankshaft with a cutting blade rigidly secured on the lower end of the crankshaft and a flywheel rigidly secured on the upper end of the crankshaft; an emergency brake for stopping rotation of the crankshaft and the cutting blade carried thereby, comprising an annular braking surface on the flywheel concentric with the crankshaft axis, a friction brake band surrounding said surface, means anchoring one end of said brake band on the engine, a lever pivoted on the engine and connected to the opposite end of said brake band whereby pivoting of said lever in one direction causes said brake band to engage said surface for stopping the engine, a spring urging said lever in said one direction, a pivoted catch engageable with said lever for retaining the same in a cocked position in which said brake band is out of engagement with said surface, and a control member leading from said catch to adjacent the handle of the mower for disengaging the catch from said lever whereby said spring is effective to pivot said lever to engage said band with said surface and substantially instantaneously stop rotation of said crankshaft.

5. In an internal combustion engine for a rotary lawn mower, said engine having a vertically disposed crankshaft and a cutting blade rigidly secured on the lower end of the crankshaft so as to be rotated at crankshaft speeds at all times, an emergency brake for stopping rotation of both the crankshaft and the cutting blade carried thereby comprising a part rotatable with the crankshaft of the engine and having a braking surface thereon, a brake element movable into and out of engagement with said braking surface, spring means urging said brake element into engagement with said braking surface, a cocking lever engageable with said brake element and movable to a cocked position for retaining said brake element out of engagement with said braking surface, catch means releasably holding said cocking lever in said cocked position, and a control member connected to said catch means and to a trigger adjacent the handle of the mower for releasing said catch means from said cocking lever whereby said spring means is effective to engage said brake element with said braking surface to substantially instantaneously stop both said engine and the cutting blade carried thereby.

6. In an internal combustion engine for a rotary lawn mower, said engine having a vertically disposed crankshaft and a cutting blade rigidly secured on the lower end of the crankshaft, an emergency brake for stopping rotation of the crankshaft and the cutting blade carried thereby comprising a flywheel rotatable with the crankshaft of the engine and having a braking surface thereon, a flexible brake band surrounding said flywheel and movable into and out of engagement with said braking surface, spring means urging said brake band into engagement with said braking surface, a cocking lever engageable with said brake band and movable to a cocked position for retaining said brake band out of engagement with said braking surface, catch means releasably holding said cocking lever in said cocked position, and a control member connected to said catch means and to a trigger adjacent the handle of the mower for releasing said catch means from said cocking lever whereby said spring means is effective to engage said brake band with said braking surface to substantially instantaneously stop said engine and the cutting blade carried thereby.

7. A brake according to claim 6 wherein said brake band comprises a coil of spring wire, one end of said wire being secured to said engine and the other end thereof being engageable by said cocking lever.

8. In an internal combustion engine for a rotary lawn mower, said engine having a vertically disposed crankshaft and a cutting blade rigidly secured on the lower end of the crankshaft so as to be rotated at crankshaft speeds at all times, an emergency brake for stopping rotation of both the crankshaft and the cutting blade carried thereby comprising a disc rotatable with the crankshaft of the engine and having a braking surface thereon, a pair of pivoted lever arms extending across and on opposite sides of said disc at one side of said crankshaft, said lever arms having brake lining thereon and being movable into and out of engagement with said braking surface, spring means urging said lever arms toward each other and into engagement with said braking surface, a cocking lever engageable with said lever arms and movable to a cocked position thereof in which said lever arms are separated to disengage said braking surface, detent means releasably holding said cocking lever in said cocked position, and a control member connected to said detent means and to a trigger adjacent the handle of the mower for releasing said detent means from said cocking lever whereby said spring means is effective to force said lever arms toward each other to engage said brake linings with said braking surface to substantially instantaneously stop both said engine and the cutting blade carried thereby.

9. In a rotary lawn mower powered by an internal combustion engine having a vertically disposed crankshaft with a cutting blade rigidly secured on the lower end of the crankshaft and a flywheel rigidly secured on the upper end of the crankshaft; an emergency brake for stopping rotation of the crankshaft and the cutting blade carried thereby, comprising an annular brake surface on the flywheel concentric with the crankshaft axis, a friction brake band surrounding said surface, means anchoring one end of said brake band on the engine, a lever pivoted on the engine and connected to the opposite end of said brake band whereby pivoting of said lever in one direction causes said brake band to engage said surface for stopping the engine, a spring urging said lever in said one direction, detent means engageable with said lever for retaining the same in a cocked position in which said band is out of engagement with said surface, and manually operable means for disengaging the detent means from said lever whereby said spring is effective to pivot said lever to engage said band with said surface and substantially instantnaeously stop said engine.

10. In an internal combustion engine having a crankshaft and an element driven by the crankshaft at a speed proportional to crankshaft speed, an emergency brake for stopping rotation of the crankshaft and movement of the driven element comprising a part rotatable with the crankshaft of the engine and having a braking surface thereon, a brake element movable into and out of engagement with said braking surface, spring means urging said brake element into engagement with said braking surface, a cooking lever engageable with said brake element and movable to a cocked position for retaining said brake element out of engagement with said braking surface, catch means releasably holding said cocking lever in said cocked position, and control means connected to said catch means for releasing said catch means from said cocking lever whereby said spring means is effective to engage said brake element with said braking surface to substantially instantaneously stop both said engine and the driven element.

11. In an internal combustion engine having a crankshaft with a flywheel thereon and an element driven by the crankshaft, an emergency brake for stopping rotation of the crankshaft and the driven element comprising a braking surface carried by and forming a part of said flywheel, a brake element movable into and out of engagement with said braking surface, spring means urging said brake element into engagement with said braking surface, a cocking lever engageable with said brake element and movable to a cocked position for retaining said brake element out of engagement with said braking surface, means connected to said cocking lever for holding said cocking lever in said cocked position, and control means connected to said holding means for releasing said cocking lever whereby said spring means is effective to engage said brake element with said braking surface to substantially instantaneously stop said engine and the driven element.

References Cited by the Examiner
UNITED STATES PATENTS

| | | | |
|---|---|---|---|
| 2,167,171 | 7/1939 | Dodge | 188—77 |
| 2,875,858 | 3/1959 | Dunham | 188—77 |
| 2,985,992 | 5/1961 | Dowdle | 56—25.4 |
| 3,026,665 | 3/1962 | Hoff | 56—25.4 |

DUANE A. REGER, *Primary Examiner.*

UNITED STATES PATENT OFFICE
CERTIFICATE OF CORRECTION

Patent No. 3,290,871　　　　　　　　　　　　　　December 13, 1966

Lowell E. Haas

It is hereby certified that error appears in the above numbered patent requiring correction and that the said Letters Patent should read as corrected below.

Column 4, line 16, for "rapidly" read -- rigidly --.

Signed and sealed this 16th day of July 1968.

(SEAL)
Attest:

Edward M. Fletcher, Jr.　　　　　　　　　　　　EDWARD J. BRENNER
Attesting Officer　　　　　　　　　　　　　　　Commissioner of Patents